Feb. 20, 1923.
P. H. HENDRICKSON.
SPRING DEVICE.
FILED JAN. 5, 1922.
1,445,765.
2 SHEETS—SHEET 1.
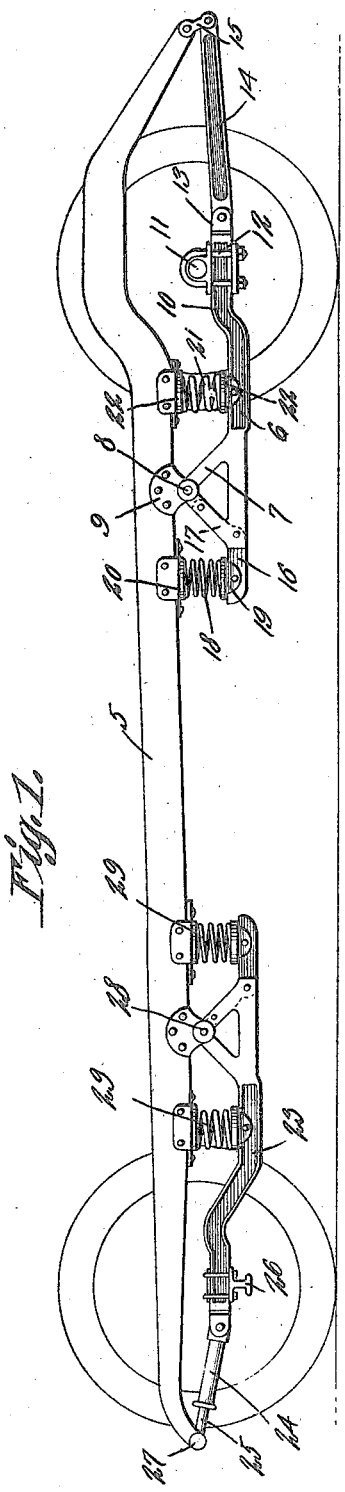
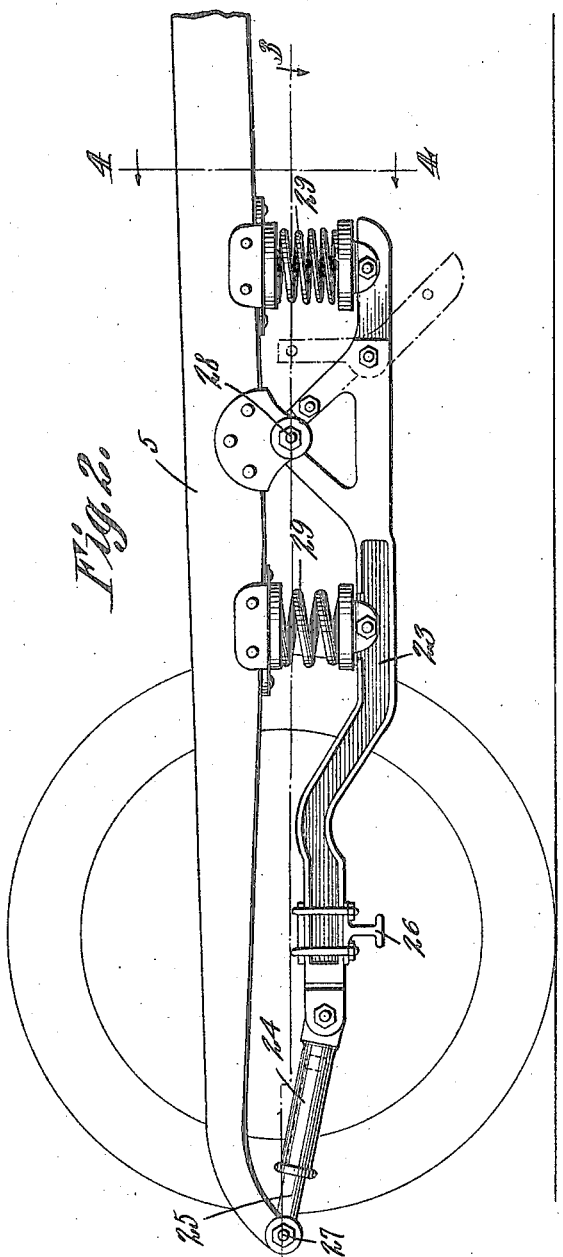
Inventor
P. H. Hendrickson
Attorneys Feb. 20, 1923.
P. H. HENDRICKSON.
SPRING DEVICE.
FILED JAN. 5, 1922.
1,445,765.
2 SHEETS—SHEET 2.
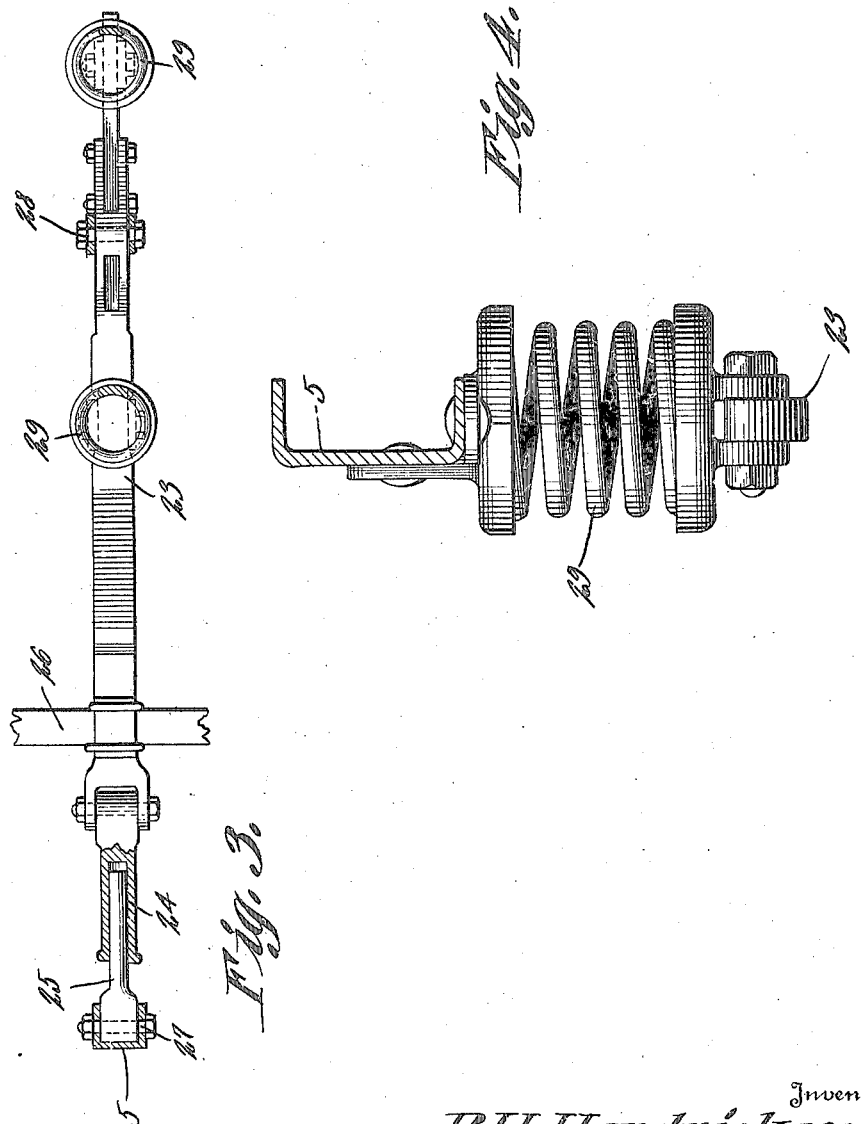
Inventor,
P. H. Hendrickson.
By C. A. Snow & Co.
Attorneys.

Patented Feb. 20, 1923.

1,445,765

UNITED STATES PATENT OFFICE.

PETER H. HENDRICKSON, OF COEUR D'ALENE, IDAHO.

SPRING DEVICE.

Application filed January 5, 1922. Serial No. 527,131.

*To all whom it may concern:*

Be it known that I, PETER H. HENDRICKSON, a citizen of the United States, residing at Coeur D'Alene, in the county of Kootenai and State of Idaho, have invented a new and useful Spring Device, of which the following is a specification.

This invention relates to spring devices, and more particularly to spring devices especially designed for use in connection with motor vehicles, or the like.

The primary object of the invention is to provide novel means disposed between the supporting axles and chassis of a motor vehicle, for absorbing shocks usually directed to the axles, and distributing the same throughout the entire chassis, to enhance the riding qualities of the vehicle to which the spring devices are applied.

Another object of the invention is to provide a device of this character which will compensate for movement of the axles longitudinally of the chassis of the vehicle.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a side elevational view of a motor vehicle chassis disclosing spring devices constructed in accordance with the present invention as applied.

Figure 2 is an enlarged side elevational view of the front spring device.

Figure 3 is a sectional view taken on line 3—3 of Figure 2.

Figure 4 is an enlarged sectional view taken on line 4—4 of Figure 2.

Referring to the drawings in detail, the side rail of a vehicle chassis is indicated at 5, which side rail is of the usual construction.

The rear spring device embodies an arm 6 provided with an upwardly extending bracket 7 having a suitable opening to accommodate the bolt 8, by means of which the bracket 7 may have pivotal connection with the side rail 5 as through the medium of the bracket member 9, which is shown as bolted to the side rail 5.

The arm 6 is formed with an offset portion 10 which is secured to the rear axle 11 as by means of the U-bolts 12. One end of the reduced portion 10 is provided with spaced ears 13, that accommodate the arm 14, which is pivotally connected with the ears, the opposite end of the arm 14 having connection with the forward end of the rail 5, as by means of the shackles 15.

Pivotally connected with the arm 6, is a section 16 which has an angularly disposed portion 17 adapted to move into engagement with the bracket member 7, when the same is in its active position, but move downwardly in a position to permit the spring members 18 to be secured to the side rail. Supported by the section 16 is a cup 19 that provides a rest for the lower extremity of the spring 18, the upper end of the spring being positioned in the cup 20 bolted to the side rail 5. Associated with the spring member 18 and disposed on the opposite side of the bracket member 7 is a spring 21, which has its ends mounted in the cups 22, the springs being for the purpose of normally exerting a pressure on the arm 6 and side rail 5, to hold the same in spaced relation with each other.

The spring device employed at the rear of the vehicle, is similar to that used at the forward end thereof, except that the arm 23 has connection with the extreme end of the side rail 5 associated therewith, as by means of the cylinder 24 and plunger 25 operating therein.

From the foregoing it will be seen that movement between the axle 26 and side rail of a chassis may be compensated for, by the piston moving within its cylinder.

As shown, the piston has pivotal connection with the side rail as at 27. This arm 23 is pivotally connected with the rail associated therewith, as at 28, the coiled springs 29 being supported between the arm 23 and rail 5, to restrict movement of the forward end of the arm 23 with respect to the side rail.

It is believed that in view of the foregoing description, a further detail description of the operation of the device is unnecessary.

Having thus described the invention, what is claimed as new is:—

In combination with the side rails of the chassis of the vehicle, spring devices, each spring device comprising an arm, a bracket member formed at one end of the arm, said bracket member comprising spaced arms, a spring supporting section comprising an arm pivotally supported between the spaced arms of the bracket members, means for securing the last mentioned arm against movement, a spring disposed between the spring supporting section, and side rail, a spring supported adjacent to the opposite side of the bracket member and secured to the side rail, and means for connecting one end of the first mentioned arm and end of rail of the chassis to permit of movement of the chassis with respect to the first mentioned arm.

In testimony that I claim the foregoing as my own, I have hereto affixed my signature in the presence of two witnesses.

PETER H. HENDRICKSON

Witnesses:
H. ISASSILE,
H. H. HUBBARD.